(12) United States Patent
Köhnke

(10) Patent No.: US 10,391,873 B2
(45) Date of Patent: Aug. 27, 2019

(54) MOBILE ENERGY STORAGE AND METHOD FOR PROVIDING ENERGY TO A CONSUMER

(71) Applicant: VOLKSWAGEN AG, Wolfsburg (DE)

(72) Inventor: Axel Köhnke, Dülmen (DE)

(73) Assignee: Volkswagen AG

( * ) Notice: Subject to any disclaimer, the term of this patent is extended or adjusted under 35 U.S.C. 154(b) by 0 days.

(21) Appl. No.: 15/381,199

(22) Filed: Dec. 16, 2016

(65) Prior Publication Data
US 2017/0174092 A1     Jun. 22, 2017

(30) Foreign Application Priority Data

Dec. 17, 2015  (DE) .................. 10 2015 225 789

(51) Int. Cl.
*B60L 53/00* (2019.01)
*B60L 11/18* (2006.01)
(Continued)

(52) U.S. Cl.
CPC .......... *B60L 11/1824* (2013.01); *B60L 53/00* (2019.02); *B60L 53/30* (2019.02); *B60L 53/305* (2019.02); *B60L 53/60* (2019.02); *B60L 53/65* (2019.02); *B60L 53/68* (2019.02); *B60L 53/80* (2019.02); *G01C 21/3438* (2013.01); *G05D 1/0088* (2013.01); *G05D 1/0295* (2013.01); *H02J 5/00* (2013.01); *H02J 7/0054* (2013.01); *B60L 2200/28* (2013.01); *G01C 21/3469* (2013.01); *G05D 2201/0213* (2013.01); *Y02T 10/7005* (2013.01); *Y02T 10/7088* (2013.01); *Y02T 90/121* (2013.01); *Y02T 90/124* (2013.01); *Y02T 90/128* (2013.01); *Y02T 90/14* (2013.01); *Y02T 90/161* (2013.01); *Y02T 90/163* (2013.01);
(Continued)

(58) Field of Classification Search
None
See application file for complete search history.

(56) References Cited

U.S. PATENT DOCUMENTS 9,857,255 B2 *  1/2018  Hagan .................... G01L 5/136
9,927,778 B2 *  3/2018  Mailloux .............. H02J 7/0013
(Continued)

FOREIGN PATENT DOCUMENTS

DE     102010035299 A1     2/2012
DE     102012214750 A1     11/2013
(Continued)

OTHER PUBLICATIONS

Search Report for German Patent Application No. 10 2015 225 789.4; dated Jul. 8, 2016.

*Primary Examiner* — Christian Chase
*Assistant Examiner* — Edward Torchinsky
(74) *Attorney, Agent, or Firm* — Barnes & Thornburg LLP

(57) ABSTRACT

A mobile energy store which includes a storage device which delivers energy stored therein to a load. The mobile energy store includes a receiving device which receives a request signal of the load. The request signal includes at least information about a location distant from a charging station for the mobile energy store. The mobile energy store also includes a drive device which moves the mobile energy store autonomously in the public road traffic from the charging station to the location distant from the charging station based on the request signal.

15 Claims, 3 Drawing Sheets

(51) Int. Cl.
  *B60L 53/30* (2019.01)
  *G01C 21/34* (2006.01)
  *G05D 1/00* (2006.01)
  *G05D 1/02* (2006.01)
  *H02J 5/00* (2016.01)
  *H02J 7/00* (2006.01)
  *B60L 53/80* (2019.01)
  *B60L 53/60* (2019.01)
  *B60L 53/65* (2019.01)
  *B60L 53/68* (2019.01)

(52) U.S. Cl.
  CPC ............ *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | | |
|---|---|---|---|---|
| 2005/0162106 A1* | 7/2005 | Cho | ............ | B60K 6/46 318/139 |
| 2010/0044998 A1* | 2/2010 | Franchineau | ............ | B60D 1/36 280/491.1 |
| 2010/0065344 A1* | 3/2010 | Collings, III | ............ | B60K 6/46 180/2.1 |
| 2011/0106294 A1* | 5/2011 | Bebbington | ............ | B66F 9/0754 700/215 |
| 2011/0282807 A1* | 11/2011 | Colello | ............ | G06Q 50/06 705/412 |
| 2012/0041804 A1 | 2/2012 | Sahinoglu et al. | | |
| 2012/0193153 A1* | 8/2012 | Wellborn | ............ | B62D 59/04 180/14.2 |
| 2012/0193154 A1* | 8/2012 | Wellborn | ............ | B62D 59/04 180/14.2 |
| 2012/0245796 A1* | 9/2012 | Yu | ............ | B62D 13/06 701/41 |
| 2013/0006451 A1* | 1/2013 | Cooper | ............ | B61L 3/006 701/19 |

FOREIGN PATENT DOCUMENTS

| | | | |
|---|---|---|---|
| DE | 102012015099 A1 | 2/2014 | |
| DE | 102012016234 A1 | 2/2014 | |
| WO | WO-2016156383 A1 * | 10/2016 | ............ B60L 11/182 |

\* cited by examiner

MOBILE ENERGY STORAGE AND METHOD FOR PROVIDING ENERGY TO A CONSUMER

PRIORITY CLAIM

This patent application claims priority to German Patent Application No. 10 2015 225 789.4, filed 17 Dec. 2015, the disclosure of which is incorporated herein by reference in its entirety.

SUMMARY

Illustrative embodiments relate to the provision of energy for a load. Illustrative embodiments relate to a mobile energy store for providing energy.

BRIEF DESCRIPTION OF THE DRAWINGS

Exemplary embodiments are explained in greater detail in the following, with reference to the appended figures, wherein.

DETAILED DESCRIPTION

Figure 1:
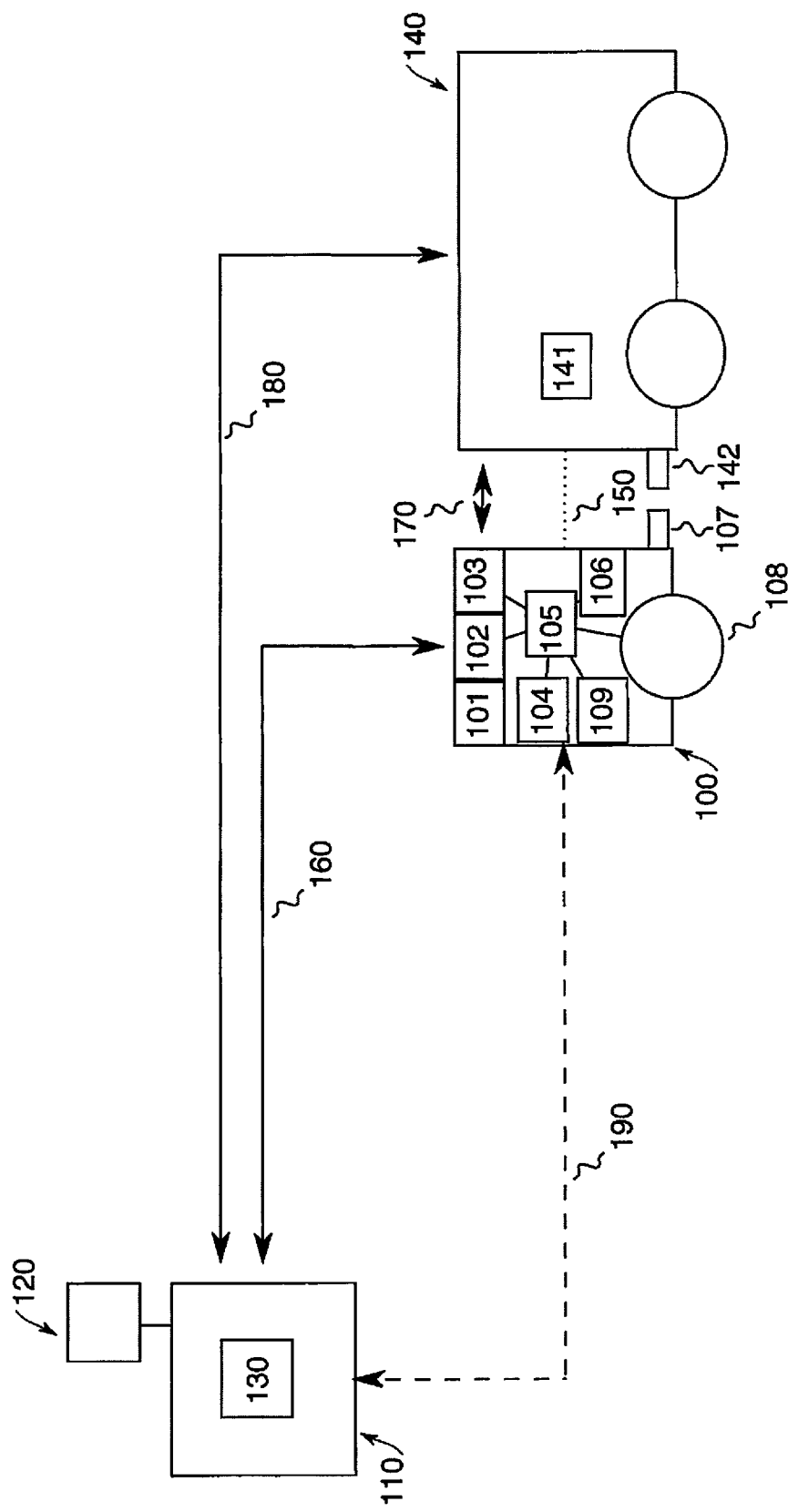
FIG. 1 shows an application scenario for a mobile energy store in which the load is an electrically-driven vehicle.

Regenerative energy generation represents a virtually inexhaustible source for electrical energy. Frequently, however, the transporting of the electrical energy from the place of generation (e.g., wind power plant, photovoltaic installation) to the load is problematic. In regions that are sparsely populated or difficult to access, the construction of electricity transmission lines, or the expansion of already existing electricity transmission lines, is often uneconomic.

Electromobility, however, is reliant on the comprehensive availability of electrical energy. Despite great progress in battery technology, modern storage batteries for electrically driven vehicles are still of an energy density that limits electromobility. An electrically driven vehicle in this case may be, for example, a passenger car, a truck, a motor cycle or a tractor. Generally, a vehicle may be understood to be a device that comprises a motor, a drivetrain system and wheels.

With respect to electromobility, there is additionally the problem that the network of charging stations for electrically driven vehicles is (still) relatively sparse. Also, a charging operation at such a charging station (still) takes a relatively long period of time.

To increase the range of an electrically driven vehicle, the publication DE 10 2012 015 099 A1 proposes a network of relay stations at which the electrically driven vehicle can receive, exchange or return a trailer-based range extender. Coupling-on and uncoupling of the trailer-based range extender in this case is effected fully automatically. The electrically driven vehicle is thus coupled to an additional, exchangeable energy store, to extend the capacity of its own energy store. In this case, however, a user of the electrically driven vehicle must in each case search for a relay station to couple-on or uncouple a trailer-based range extender. Electrical energy for the electrically driven vehicle can thus be provided only at fixed locations, but not at locations of actual need. For a user of an electrically driven vehicle, this may mean, for example, a detour, or a loss of time, if there is no relay present along the desired travel route.

The publication DE 10 2012 016 234 A1 discloses a trailer for a vehicle driven by a conventional internal combustion engine or having a hybrid drive. The trailer in this case comprises an electric drive, to enable the vehicle to be driven by an electric motor, e.g., in emission-restricted zones. The trailer can be coupled to, or uncoupled from, the vehicle at change stations at the entrances to, or exits from, the emission-restricted zones. This can be performed fully automatically. A conventional vehicle or a hybrid vehicle can thus be supplemented by an electric drive. Again, however, this requires a user of the vehicle to search for a change station. Also, the trailer shown in the publication DE 10 2012 016 234 A1 is designed only for short distances.

Known from the publication DE 10 2010 035 299 A1 is a method for moving a trailer into a position in which it is possible to couple the trailer to a towing vehicle. In this case, an integrated travel drive causes the trailer to automatically travel a trajectory that is calculated from data of a sensor means. After the trajectory has been traveled, coupling to the towing unit can be effected (inter alia, fully automatically).

There is thus a need to provide an energy store that enables energy to be transported to a load. There is a requirement for a locally variable provision of energy for a load.

Disclosed embodiments render this possible by a mobile energy store, which comprises a storage device, which is designed to deliver energy stored therein to a load. The storage device in this case may comprise, for example, one or more lead storage batteries, one or more lithium-ion storage batteries, one or more lithium-polymer storage batteries, one or more nickel-metal hydride storage batteries, one or more nickel-cadmium storage batteries, one or more sodium-sulfur storage batteries, one or more silver-zinc storage batteries, one or more tin-sulfur-lithium storage batteries, or one or more aluminum-ion storage batteries. Combinations of differing storage batteries are likewise possible. The storage device may thus be designed to store the energy as electrical energy. Alternatively or additionally, the storage device may also be designed to store the energy as an energy-carrying medium (e.g., hydrogen or ethanol). The storage device may thus comprise, for example, a tank, to store the energy-carrying medium therein, and to deliver it therefrom to the load.

The mobile energy store additionally comprises a receiving device, which is designed to receive a request signal of the load. The request signal in this case includes at least information about a location distant from a charging station for the mobile energy store, i.e., a location of the actual energy demand is indicated to the mobile energy store. The distant location may be, for example, the location of an electrically driven vehicle, or the position of another load. Such a load may be, for example, a structure such as, for instance, a house, a booth, a hangar or a tent. The information about the location distant from the charging station in this case may contain, for example, directly instantaneous or predicted future coordinates of the location, or also a combination of an instantaneous location and a motion vector of the load.

Furthermore, the mobile energy store comprises a drive device, which is designed to move the mobile energy store autonomously in the public road traffic, from the charging station to the location distant from the charging station, on the basis of the request signal. The mobile energy store can thus be moved to the location of the actual energy demand, to provide the required energy there. Owing to the drive device being designed as an autonomous, i.e., self-propelled, drive device, there is no need for any further, external intervention, or action, for the transporting of energy.

A user of an electrically driven vehicle can thus be spared the task of searching for a charging station, a change station, a relay station, etc., since the mobile energy store can be provided at the location at which energy is actually required, to couple the mobile energy store there to the electrically driven vehicle. A user can thus, for example, avoid a detour if there is no charging station, change station, relay station etc. present along a desired travel route. If the electrically driven vehicle has a storage battery as an energy store, electrical energy can be delivered to the storage battery of the vehicle from the storage device of the mobile energy store. If the electrically driven vehicle has a fuel-cell based energy supply, then, for example, hydrogen can be delivered to the corresponding tank of the vehicle from the storage device of the mobile energy store. For other loads, also, energy can be provided at a location of actual consumption. In sparsely populated regions, for example, electrical energy can be provided in this way for a single building, without the need for the construction of electricity transmission lines. Also temporary structures such as, for instance, a tent, can easily be supplied with electrical energy by the mobile energy store, without the need for an electrical line to be laid from an already existing line to the location of the temporary structure. It is thus also possible to avoid the provision of electric power sets driven by an internal combustion engine, which emit both noise and exhaust gases.

According to some exemplary embodiments, the receiving device is designed to receive the request signal of the load from the charging station. As a result of the request signal being received from the charging station, a communication of the mobile energy store with the charging station may initially be sufficient. The request signal may also be preprocessed if, for example, the request signal is first sent from the load to a central processing node that forwards the signal, on the basis of the information contained therein concerning the location, to the most appropriate of a plurality of charging stations (e.g., to the charging station that is least distant from the location), such that a mobile energy store assigned to the charging station can move autonomously from the latter to the location indicated in the request signal. A data traffic between the plurality of charging stations, or mobile energy stores, can thus be reduced, since negotiation between the charging stations, or mobile energy stores, concerning responsibility, or action, is not necessary. Also, the information, contained in the request signal, concerning the location distant from the charging station can be preprocessed and, for example, pre-evaluated, thus to reduce an extent of computing or evaluation for the mobile energy store.

In some exemplary embodiments, the location distant from the charging station is an instantaneous position of the load, or a predicted future position of the load. The mobile energy store can thus provided energy to the load in a manner that is situationally appropriate to the demand. If, for example, an electrically driven vehicle is parked in a public car-park, a mobile energy store can be requested for the instantaneous position of the electrically driven vehicle, to charge the vehicle during the parked period. If a user of an electrically driven vehicle undertakes, for example, a journey whose length exceeds the capacity of an energy store integrated in the vehicle, a location at which the vehicle requires externally supplied electrical energy to reach the destination can be predicted on the basis, for example, of a destination input into the navigation system and of instantaneous state data of the vehicle (remaining charge of the energy store, instantaneous energy consumption, average energy consumption, driver profile, etc.). Accordingly, information about the predicted location can be included in the request signal, to move the mobile energy store autonomously to the location of the future actual demand. There, the mobile energy store can be coupled to the vehicle. A user of an electrically driven vehicle can thus be spared the task of searching for a charging station, or a range of the electrically driven vehicle can be increased.

According to some exemplary embodiments, the request signal may include further information. For example, besides the instantaneous position or the predicted future position of the load, a desired time for the arrival of the mobile energy store at the respective location may be included. It can thus be ensured, for example, that the mobile energy store is available at the future predicted location, to avoid the user of the vehicle having to wait for the mobile energy store. Also, for example, in the case of a vehicle that is parked overnight, it can be ensured, by the selection of an appropriate time for the arrival of the energy store at the parking location, that the mobile energy store is coupled to the vehicle in good time, such that in the morning the vehicle has been charged and is ready for further travel.

In some exemplary embodiments, the drive device comprises at least one navigation device, which is designed to determine an instantaneous position of the mobile energy store. The navigation device in this case may use a common position determining system such as, for instance, GPS, Galileo, GLONASS or Beidou. Further, the drive device comprises at least one sensor element, which is designed to sense other road users. The sensor element may be, for example, an infrared sensor, a radar sensor, an ultrasonic sensor, an optical sensor or a combination thereof. Further, the drive device also comprises at least one control device, which is designed to control wheels of the mobile energy store on the basis of information of the sensor element about other road users, the instantaneous position of the mobile energy store and the request signal of the load. The mobile energy store in this case may have individually driven wheels (each having, for example, one electric motor per wheel), to thereby enable the mobile energy store to be steered. Alternatively, the mobile energy store may also have an axle drive and a system of steering one or more wheels, to enable the mobile energy store to be steered. For the purpose of data processing, the drive device may additionally have one or more processors, or integrated circuits, which execute a program code to control the wheels of the mobile energy store on the basis of the data. The drive device according to the exemplary embodiment allows the mobile energy store to move autonomously, in a traffic-safe manner, in the public road traffic.

According to some exemplary embodiments, the mobile energy store additionally comprises a communication device, which is designed to send identification information of the mobile energy store to the load, receive identification information of the load from the latter, and to exchange with the load information relating to the coupling of the mobile energy store to the load. The communication device permits communication that is preparatory to the coupling of the load and the mobile energy store, and an exchange of data during the coupling. For example, the communication device can begin to send identification information of the mobile energy store to the load as soon as a distance of the mobile energy store from the location that is distant from the charging station is less than a threshold value, to signal to the load that the mobile energy store is (will shortly be) ready for coupling. Likewise, the mobile energy store, by receiving the identification information of the load, can initiate operations necessary for the coupling, such that, when the load arrives at the location that is distant from the charging point, the mobile energy store is ready for coupling. Further information such as, for instance, the type of the load, may be exchanged between the load and the mobile energy store, for the purpose of preparing the coupling operation. The information relating to the coupling of the mobile energy store to the load may also include, for example, information for the pairing of the mobile energy store with the load. If the load is, for example, an electrically driven vehicle that is to be coupled to the mobile energy store during travel, the information may include, for example, locating information, such that the mobile energy store can follow the vehicle, to couple to the vehicle in a coupling operation. The mobile energy store may also send to the vehicle, for example, information for a driver of the vehicle, or for the vehicle itself. Thus, for example, in the case of an intended coupling in travelling mode, a signal that starts a coupling program of the vehicle may be sent to the vehicle, for instance, to set a constant speed of the vehicle or to issue a warning message or instructions for a driver of the vehicle.

In some exemplary embodiments, the mobile energy store additionally comprises a second sensor element, which is designed to determine a first relative position of a coupling device of the mobile energy store in relation to a coupling device of the load. The second sensor element may be, for example, an optical sensor. The drive device in this case is designed to move the mobile energy store, on the basis of the first relative position, into a second relative position, with respect to the load, that allows the coupling device of the mobile energy store to be coupled to the coupling device of the load. For this purpose, the drive device may perform, for example, an analysis of the data of the second sensor element, and calculate a trajectory for the movement of the mobile energy store. The operations of sensing the first relative position and determining the second relative position may in this case be effected iteratively. The mobile energy store in this case is designed to couple autonomously to the coupling device of the load when the mobile energy store is in the second relative position with respect to the load. For this purpose, the coupling device of the mobile energy store may be, for example, movably disposed on the mobile energy store to be coupled to the coupling device of the load, in the second relative position. Alternatively, the coupling device of the mobile energy store may also be rigidly connected to the mobile energy store, if the mobile energy store as a whole is movable relative to the coupling device of the load.

Moreover, the autonomous coupling of the mobile energy store to the load can increase convenience for a user or person responsible for the load. Thus, even technically less competent users can use the mobile energy store, since the coupling operation does not require any action on their part. If the load is, for example, a structure, the mobile energy store can move autonomously to the structure upon request, and couple to the coupling device, without the need for any human intervention. Accordingly, energy can be already provided, for example, before a user of the structure (e.g., a booth) arrives, such that this energy can be utilized by the user immediately after the latter arrives. If the load is, for example, an electrically driven vehicle, the autonomous coupling can enable the vehicle and a mobile energy store to be coupled while the vehicle is travelling, since the mobile energy store can determine its first relative position in relation to the vehicle and move into the second relative position with respect to the travelling vehicle, to couple there to the vehicle. Electrical energy can thus be externally provided to an electrically driven vehicle at a suitable location while travelling is ongoing, thus, for example, to increase a range of the vehicle. Information relating to the coupling of the mobile energy store to the vehicle can be exchanged in preparation, via the communication device described above, before the vehicle and the mobile energy store are coupled.

According to some exemplary embodiments, the coupling device of the mobile energy store is designed to mechanically and electrically couple the mobile energy store to the load. The use of a single device for mechanical and electrical coupling can reduce the complexity of coupling-on, since, after a mechanical coupling has been effected, there is no need for any further operation for electrical coupling of the load and the mobile energy store. Correspondingly, the complexity of uncoupling the mobile energy store and the load can also be reduced. The complexity can be reduced considerably in the case of the mobile energy store being coupled to, or uncoupled from, a travelling electrically driven vehicle.

In some exemplary embodiments, the coupling device of the mobile energy store is additionally designed to uncouple autonomously from the coupling device of the load if the charge state of the storage device of the mobile energy store is below a first threshold value, or the charge state of an energy store of the load exceeds a second threshold value. Uncoupling after the charge state of the storage device of the mobile energy store being below a first threshold value can ensure that there is sufficient electrical energy remaining in the storage device to move the energy store back to a charging station. The first threshold value may be, for example, 30%, 25%, 20%, 15%, 10% or 5% of a maximum capacity of the storage device of the mobile energy store. Uncoupling after the charge state of the energy store of the load exceeds a second threshold value can ensure that the mobile energy store does not remain coupled to the load for an unnecessarily long period of time, and can therefore be made available to other loads. The first threshold value may be, for example, 75%, 80%, 85%, 90%, 95%, 99% or 100% of a maximum capacity of the energy store of the load. If the load is an electrically driven vehicle, it is thus possible, for example, to avoid the mobile energy store being taken along unnecessarily. It is thereby possible, for example, to reduce loading of the electric motor of the vehicle, and consequently an energy consumption of the vehicle.

According to some exemplary embodiments, the drive device is additionally designed, after the uncoupling of the mobile energy store from the load, to autonomously move the mobile energy store, on the basis of a current position of the mobile energy store, either to the charging station from which the mobile energy store has moved autonomously to the location distant from the charging station, or to a different charging station that is located closer to the current position of the mobile energy store. The current position of the mobile energy store may be determined, for example, by the navigation device of the drive device. The drive device thus allows the mobile energy store to be moved to a nearest charging station, where the mobile energy store can be charged and made available to further loads. Utilization of the mobile energy store can thus be increased. Equally, long return routes of the mobile energy store, from the load to the original charging station, which is now possibly at a great distance, can be avoided.

In some exemplary embodiments, the mobile energy store is additionally designed to store (e.g., electrical) energy provided by the load. It is thus possible for energy to be transported, not only unilaterally, from the charging station to the load, but in both directions. The mobile energy store can thus be used, for example, as part of so-called "smart grid" concepts, for example, to transport electrical energy to parked electrically driven vehicles, which are used as a buffer store. In the case of a demand for electrical energy, the energy buffered in the vehicle can be taken up by the mobile energy store and fed back into the electric power grid, via the charging station. In some exemplary embodiments, therefore, the charging station is designed both to draw electrical energy from the electric power grid and to feed electrical energy into the electric power grid. The mobile energy stores can thus be used for autonomous energy transport as part of "smart grid" concepts.

According to some exemplary embodiments, the load is an electrically driven vehicle. As described above, an electrically driven vehicle can be supplied with (electrical) energy in a decentralized manner, according to requirements, by the mobile energy store.

In some exemplary embodiments, the request signal is based on an input of a user of the vehicle, or on an energy demand calculated by the vehicle. Thus, on the one hand, a user of the vehicle can request (electrical) energy according to the driver's own wishes. On the other hand, the vehicle can automatically request (electrical) energy, to ensure operational readiness of the vehicle. For this purpose, the vehicle may evaluate, for example, state data of the vehicle. For example, a remaining charge of the energy store of the vehicle, an instantaneous energy consumption, an average energy consumption, a destination input into a navigation system, or information, or a profile, of the driver may be used as state data. Alternatively or additionally, further data of vehicle users may be used. For example, calendar entries from a mobile communication device of the vehicle user may be called up and evaluated. According to some exemplary embodiments, the data may be sent to a central evaluation node, which transmits an analysis result to the vehicle. On the basis of the analysis result, the vehicle may send out a request signal.

A further disclosed embodiment comprises a method for providing energy for a load (e.g., an electrically driven vehicle or a structure) by means of a mobile energy store. The method comprises receiving of a request signal of the load by the mobile energy store. The request signal in this case includes at least information about a location distant from a charging station for the mobile energy store. Thus, a location of the actual energy demand is indicated to the mobile energy store. The distant location may be, for example, the location of an electrically driven vehicle, or the position of another load. Furthermore, the method comprises autonomous moving of the mobile energy store in the public road traffic, from the charging station to the location distant from the charging station, on the basis of the request signal. The mobile energy store is thus moved to the location of the actual energy demand, to provide there the required (e.g., electrical) energy). Moving autonomously in the public road traffic means that there is no need for any further, external intervention, or action, for the transporting of energy.

A user of an electrically driven vehicle (as an example of a load) can thus be spared the task of searching for a charging station, a change station, a relay station, etc., since the mobile energy store is provided at the location at which (e.g., electrical) energy is actually required. A user can thus, for example, avoid a detour if there is no charging station, change station, relay station etc. along a desired travel route. For other loads, also, energy can be provided at a location of actual consumption.

According to some exemplary embodiments, the method additionally comprises autonomous coupling of the mobile energy store to the load at the location distant from the charging station, and delivering of energy to the load by the mobile energy store. The autonomous coupling of the mobile energy store to the load can increase convenience for a user or person responsible for the load. Thus, even technically less competent users can use the mobile energy store, since the coupling operation does not require any action on their part. If the load is, for example, an electrically driven vehicle, the autonomous coupling can enable the vehicle and a mobile energy store to be coupled while the vehicle is travelling. The delivery of energy to the load may be effected, for example, both delivery of electrical energy to the load and delivery of an energy-carrying medium (e.g., hydrogen). Thus, both for an electrically driven vehicle having a storage battery and for an electrically driven vehicle having a fuel cell, energy can be provided according to the demand.

In some exemplary embodiments, the method additionally comprises autonomous uncoupling of the mobile energy store from the load if the charge state of the mobile energy store is below a first threshold value, or the charge state of an energy store of the load exceeds a second threshold value. Furthermore, the method comprises autonomous moving of the mobile energy store, on the basis of a current position of the mobile energy store, either to the charging station from which the mobile energy store has moved autonomously to the location distant from the charging station, or to a different charging station that is located closer to the current position of the mobile energy store. Uncoupling after the charge state of the mobile energy store being below a first threshold value can ensure that there is sufficient electrical energy remaining in the mobile energy store to move the mobile energy store back to a charging station. The first threshold value may be, for example, 30%, 25%, 20%, 15%, 10% or 5% of a maximum capacity of the storage device of the mobile energy store. Uncoupling after the charge state of the energy store of the load exceeds a second threshold value can ensure that the mobile energy store does not remain coupled to the load for an unnecessarily long period of time, and can therefore be made available to other loads. The first threshold value may be, for example, 75%, 80%, 85%, 90%, 95%, 99% or 100% of a maximum capacity of the energy store of the load. If the load is an electrically driven vehicle, it is thus possible, for example, to avoid the mobile energy store being taken along unnecessarily. It is thereby possible, for example, to reduce loading of the electric motor of the vehicle, and consequently an energy consumption of the vehicle. Moving of the mobile energy store to the nearest charging station can enable the mobile energy store to be charged promptly and provided for further loads. Utilization of the mobile energy store can thus be increased. Equally, long return routes of the mobile energy store, from the load to the original charging station, which is now possibly at a great distance, can be avoided.

According to some exemplary embodiments, the autonomous moving of the mobile energy store either to the charging station or to the other charging station comprises determination of whether the charge state of the mobile energy store is below a third threshold value that indicates the electrical energy required to reach either the charging station or the other charging station. The third threshold value in this case may be, for example, lower than the second threshold value. If the charge state is below the third threshold value, the method comprises autonomous coupling of the mobile energy store to a second load that is at a predefined maximum distance from a return route, determined by the mobile energy store, from the load to either the charging station or the other charging station. Moreover, the method additionally comprises storing of the energy provided by the second load, until the charge state of the mobile energy store exceeds the third threshold value, and autonomous uncoupling of the mobile energy store from the second load. The method additionally comprises autonomous moving of the mobile energy store from the second load to either the charging station or the other charging station. Checking of whether the charge state is below the third threshold value can ensure that the mobile energy store contains sufficient energy to return to a charging station. If it is ascertained that this is not the case, the mobile energy store uses the second load (e.g., an electrically driven vehicle) as an energy source along the returned return route. The mobile energy store can thus be charged to the extent that the return to the charging station is ensured. Stranding, and consequently breakdown, of the mobile energy store can thereby be avoided.

In some exemplary embodiments, the method furthermore comprises emergency charging of a load that requires energy. For this purpose, the method comprises receiving of an emergency signal of a second load by the mobile energy store, the emergency signal including information about an energy demand of the second load, and information about a current position of the second load. By means of the emergency signal, the second load can signal that it urgently, or immediately, requires (e.g., electrical) energy. For example, an electrically driven vehicle stranded because of a lack of energy can thus signal that it urgently requires electrical energy. The method furthermore comprises autonomous uncoupling of the mobile energy store from the load, autonomous moving of the mobile energy store from the load to the second load, and autonomous coupling of the mobile energy store to the second load. As a result of the mobile energy store being uncoupled from the load, and the mobile energy store being moved to the second load that requires energy, the latter can be provided with the urgently required energy. The method therefore furthermore comprises delivery to the second load, by the mobile energy store, of the quantity of energy specified in the information about the energy demand of the second load. The second load can thereby be supplied with sufficient energy to resume operation. For example, sufficient electrical energy can be supplied to a stranded electrically driven vehicle, such that the latter can then travel the route to the nearest charging station. The method additionally comprises autonomous decoupling of the mobile energy store from the second load, autonomous moving of the mobile energy store from the second load to the load, and autonomous coupling of the mobile energy store to the load. The load originally requesting the mobile energy store can thereby continue to be supplied with energy.

In some exemplary embodiments of the disclosed method, the load is an electrically driven vehicle. Energy can thus be provided to the electrically driven vehicle both when stationary and during travel, without the necessity of searching for a charging station for this purpose. Thus, in the case of a relatively long travel distance, inter alia, a detour to a charging station, and consequently also a longer travel time, can be avoided. Convenience to a user of the electrically driven vehicle can thereby be increased.

A further disclosed embodiment comprises a method for apportioning a plurality of the above mobile energy stores to a first charging station and to a second charging station for the plurality of mobile energy stores. The method in this case comprises determination of a first demand for (e.g., electrical) energy in a first region that is assigned to the first charging station, and determination of a second demand for (e.g., electrical) energy in a second region that is assigned to the second charging station. An energy demand can thus be determined for both charging stations. The method additionally comprises comparison of the first demand with the energy that is provided by the proportion of the plurality of mobile energy stores that is assigned to the first charging station, and comparison of the second demand with the energy that is provided by the proportion of the plurality of mobile energy stores that is assigned to the second charging station. It is thus possible to determine, at both charging stations, lacking or excess storage capacities that, in a further operation, can be compensated, or changed, by autonomous moving of at least one mobile energy store, out of the proportion of the plurality of mobile energy stores that is assigned to the first charging station, to the second charging station, or autonomous moving of at least one mobile energy store, out of the proportion of the plurality of mobile energy stores that is assigned to the second charging station, to the first charging station, on the basis of the comparisons. A number of mobile energy stores that is matched to the demand can thus be held ready at both charging stations. It is thus possible to avoid a lack of available mobile energy stores at one of the charging stations.

According to some exemplary embodiments, the first demand for energy and/or the second demand for energy are/is determined on the basis of usage data of a plurality of monitored electrically driven vehicles that can be coupled to the mobile energy stores. The demand for (e.g., electrical) energy by electrically driven vehicles is usually the most highly fluctuating component of the energy demand in the first region and/or second region. Accordingly, the determination of the first demand for energy, or that of the second demand for energy, on the basis of the usage data of the vehicles can allow an adequate, or precise, prediction of the energy demand in the respective region, thus to prevent a lack of available mobile energy stores at one of the charging stations.

In the case of the application scenario shown in FIG. 1, a mobile energy store 100 is used to supply an electrically driven vehicle 140 with electrical energy. The mobile energy store 100 in this case is realized as an energy store for electrical energy.

The mobile energy store 100 is initially located at a charging station 110, where it is coupled, via a coupling device 107, to a corresponding coupling device 130 of the charging station 110. In this way, a storage battery 101 of the mobile energy store 100 can be charged with electrical energy. For this purpose, the charging station 110 is connected to an energy supply 120, which may be, for example, the electric power grid or, also, a regenerative energy generation plant (e.g., wind power plant or photovoltaic installation).

If the electrically driven vehicle 140 requires electrical energy, it emits, via the communication channel 180, a request signal that includes, at least, information about the (instantaneous or future) location of the electrically driven vehicle 140, which location differs from that of the charging station 110. The communication channel 180 may be constituted, for example, by a cellular communication network. The communication channel 180 may additionally include intermediate elements that, for example, process, or pre-evaluate, the request signal 180 (such as, for instance, a central node that, in the case of a plurality of charging stations, forwards the request signal to a defined charging station, according to defined criteria).

The mobile energy store 100 has a receiving device 102, for receiving the request signal of the electrically driven vehicle 140 from the charging station 110. For this purpose, a communication channel 160 is realized between the charging station 110 and the mobile energy store 100. If the mobile energy store 100 is in the vicinity of the charging station 110, the communication channel 160 may be, for example, a wireless local area network (WLAN). Furthermore, the communication channel 160 may also be realized by a cellular communication network in the case of greater distances between a charging station 110 and a mobile energy store 100.

The mobile energy store 100 additionally comprises a drive device, to enable it to move autonomously in the public road traffic. The drive device in this case comprises a navigation device 109 for determination of position, and at least one sensor element 104 for sensing other road users. The sensor element 104 may be, for example, an infrared sensor, an optical sensor or a radar. Both the data of the navigation device 109 and of the sensor element 104 and the location information of the received request signal are processed by a control device 105, such that the latter can control the wheels 108 of the mobile energy store 100. Accordingly, the mobile energy store 100 travels the route 190, in the public road traffic, from the charging station 110 to the position of the electrically driven vehicle 140 specified in the request signal. The position of the electrically driven vehicle 140 specified in the request signal may be the instantaneous position of the electrically driven vehicle 140, as well as a future predicted position of the electrically driven vehicle 140. Accordingly, the mobile energy store 100 can navigate, for example, to a parked vehicle 140 or to a point along a planned route of the vehicle 140.

If the mobile energy store 100 is located in the vicinity of the position specified in the request signal, or at the position specified in the request signal, it communicates with the electrically driven vehicle 140 via the communication means 103. For example, the mobile energy store 100 may first emit identification information, to initiate pairing, i.e., the establishment of a communication channel 170 with the electrically driven vehicle 140. Via the communication channel 170, which may be realized, for example, via a cellular network or, also, a local-range WLAN, there can be a mutual exchange, with the electrically driven vehicle 140, of identification information and of information relating to the coupling of the mobile energy store 100 to the electrically driven vehicle 140. In the case of an intended coupling while the electrically driven vehicle 140 is travelling, there may be a need for a continuous exchange of data, for example, to transmit or receive instructions for a driver of the electrically driven vehicle 140, or information for initializing or implementing a coupling mode in the electrically driven vehicle 140.

For the purpose of implementing the coupling to the electrically driven vehicle 140, the mobile energy store 100 comprises a second sensor element 104 (e.g., an optical sensor), which determines a first relative position of the coupling device 107 of the mobile energy store 100 in relation to a coupling device 142 of the electrically driven vehicle 140. On the basis of the first relative position, the control device 105 determines a trajectory to be traveled to move the mobile energy store 100 into a second relative position, with respect to the electrically driven vehicle 140, that allows the coupling device 107 to be coupled to the coupling device 142. When the mobile energy store 100 is in the second relative position with respect to the electrically driven vehicle 140, the mobile energy store 100 autonomously couples the coupling device 107 to the coupling device 142 of the electrically driven vehicle 140. The coupling in this case comprises both a mechanical and an electrical coupling.

Following the coupling, electrical energy is transferred from the storage battery 101 of the mobile energy store 100 to the storage device 141 (e.g., storage battery) of the electrically driven vehicle 140. The electrically driven vehicle 140 can thus be supplied with electrical energy. Conversely, electrical energy can also be transferred from the storage device 141 to the storage battery 101. The electrically driven vehicle 140 can thus also be used—for example, while it is parked—as a buffer store for electrical energy.

In the course of a normal operation of charging the electrically driven vehicle 140, the mobile energy store 100 autonomously uncouples its coupling device 107 from the coupling device 142 of the electrically driven vehicle 140 if the charge state of the storage battery 101 of the mobile energy store 100 is below a first threshold value or the charge state of the energy store 141 of the electrically driven vehicle 140 exceeds a second threshold value. It can thus be ensured that sufficient energy remains in the storage battery 101 of the mobile energy store 100 to return to a charging station. It can also thereby be ensured that, after charging of the energy store 141 of the electrically driven vehicle 140 has been effected, the mobile energy store 100 no longer has to be taken along by the electrically driven vehicle 140. Furthermore, defined charging of the energy store 141 can be ensured. The energy store 141 can thus be brought, for example, to a particular desired charge state that, for example, provides an improved service life of the energy store 141. Clearly, the mobile energy store 100 can also uncouple upon a command of the user of the electrically driven vehicle 140. For example, the user can input a corresponding command into a control panel of the electrically driven vehicle 140 (e.g., select a corresponding menu item in the infotainment system of the vehicle), which command is transmitted, via the communication channel 170, to the mobile energy store 100 and executed by the latter.

Following the uncoupling of the mobile energy store 100 from the electrically driven vehicle 140, the mobile energy store 100 moves autonomously either to the charging station 110 from which the mobile energy store 100 has moved autonomously to the electrically driven vehicle 140, or to a second charging station (not shown), located closer to the current position of the mobile energy store 100. For this purpose, the navigation device 109 of the drive device may determine current position data (and, optionally, a route), and provide these data to the control device 105. The control device 105, in turn, converts these data into control commands for the wheels 108 of the mobile energy store 100. The mobile energy store 100 can thus be moved autonomously to a nearest charging station, such that unnecessary (possibly long) distances in the public road traffic can be avoided.

If there is not sufficient electrical energy in the storage battery 101 to return from the electrically driven vehicle 140 to a charging station (e.g., the charging station 110), electrically driven vehicles (but also other loads) present on the route can be used as an energy source by the mobile energy store 100. For this purpose, the mobile energy store 100 first determines whether the charge state of the storage battery 101 is below a third threshold value. The third threshold value in this case indicates the electrical energy required to reach the defined charging station. If this is the case, the mobile energy store 100 couples autonomously to a further (second) load (e.g., a further electrically driven vehicle). The second load in this case is at a predefined maximum distance from a return route, determined by the mobile energy store 100, from the electrically driven vehicle 140 to the charging station. In other words: the second load, which serves as an energy source for the mobile energy store 100, is located substantially along the return route of the mobile energy store 100 to the charging station. Following coupling to the second load, the mobile energy store 100 stores electrical energy, provided by the second load, until the charge state of the storage battery 101 of the mobile energy store 100 exceeds at least the third threshold value. For example, the third threshold value may even be exceeded by 5%, 10% or 15% to hold ready an energy reserve. Following the storage operation, the mobile energy store 100 uncouples autonomously from the second load, and the mobile energy store 100 moves autonomously from the second load to the defined charging station. In other words: the mobile energy store 100 continues its return route to the charging station.

In the case of the application scenario represented in FIG. 1, the mobile energy store 100 is realized as an energy store for electrical energy. Accordingly, the mobile energy store 100 could also be realized as an energy store for an energy-carrying medium (e.g., hydrogen), for instance, to supply energy to an electrically driven vehicle having fuel cell technology. For this purpose, instead of the storage battery 101, the mobile energy store 100 may have, for example, a tank for the energy-carrying medium. Moreover, the charging station 110 may be designed to generate the energy-carrying medium. Thus, for example, the charging station 110 may be designed to generate hydrogen from water by means of electrolysis. The electrical energy required for this may be provided, for example, by the energy supply 120 as regenerative energy.

Figure 2:
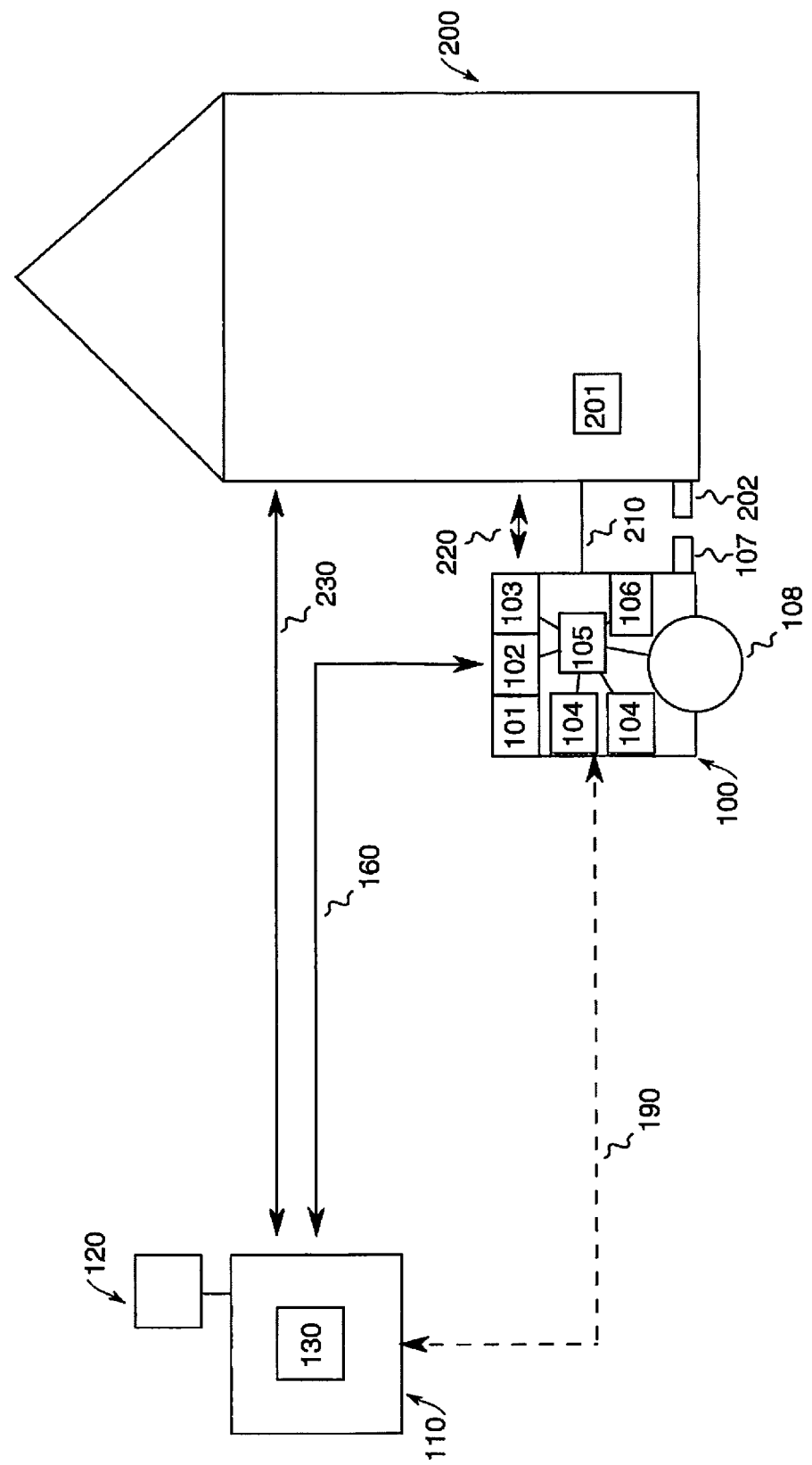
FIG. 2 shows an application scenario for a mobile energy store in which the load is a building.

A further application scenario is shown in FIG. 2, namely, the supplying of a structure 200 with electrical energy by means of the mobile energy store 100. The basic configuration of the scenario shown in FIG. 2 is similar to the scenario shown in FIG. 1, such that only the differences in the two application scenarios are pointed out in the following.

A request signal is sent from the structure to the charging station 110 via a communication channel 230. The request signal may be, for example, initiated manually by a user of the structure 200, or also automatically, by a control system in the structure 200 (e.g., as part of a domestic automation system). Alternatively, the request signal may also be initiated by a user via an application on a mobile communication device (e.g., smartphone or tablet computer), or via a corresponding input on an Internet site. The mobile energy store 100 then moves, again autonomously, via the route 190 to the structure 200, where it couples autonomously to the coupling device 202 of the structure. The communication between the mobile energy store 100 and the structure 200 in this case is effected via the communication channel 220, which may be realized, for example, via a cellular communication network, or also locally via a WLAN. Electrical energy can be provided to the structure 200 via the coupling 210 between the mobile energy store 100 and the structure 200. By means of the mobile energy store 100, therefore, electrical energy can be supplied, for example, to structures in remote areas, without any need for the structure to be connected to the electric power grid. Furthermore, for example, temporary structures such as, for instance, tents or containers (construction cabins or accommodation containers) can be supplied with electrical energy without the need for a cost-intensive connection to the local electric power grid.

Figure 3:
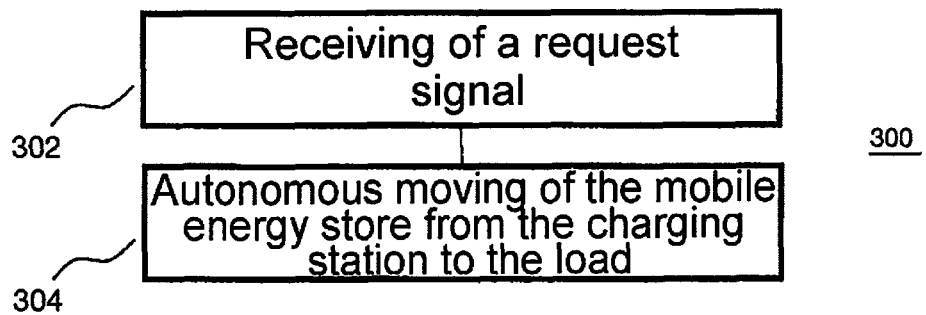
FIG. 3 shows a flow diagram of an exemplary embodiment of a method for providing energy for a load by a mobile energy store.

FIG. 3 shows a flow diagram of a method 300 for providing energy for a load (e.g., an electrically driven vehicle or a structure) by means of a disclosed mobile energy store. The method 300 comprises receiving 302 of a request signal of the load by the mobile energy store. The request signal in this case includes at least information about a location (e.g., an instantaneous or future location of the load) distant from a charging station for the mobile energy store. The method 300 additionally comprises autonomous moving 304 of the mobile energy store in the public road traffic, from the charging station to the location distant from the charging station, on the basis of the request signal.

The method 300 enables (e.g., electrical) energy to be provided to a load, via the mobile energy store, at an actual location of energy demand. If the load is, for example, an electrically driven vehicle, it is thus possible to avoid searching for a charging station by the vehicle itself. A user of the electrically driven vehicle can thus be spared the journey to the charging station. Convenience to the user can thus be increased.

Figure 4:
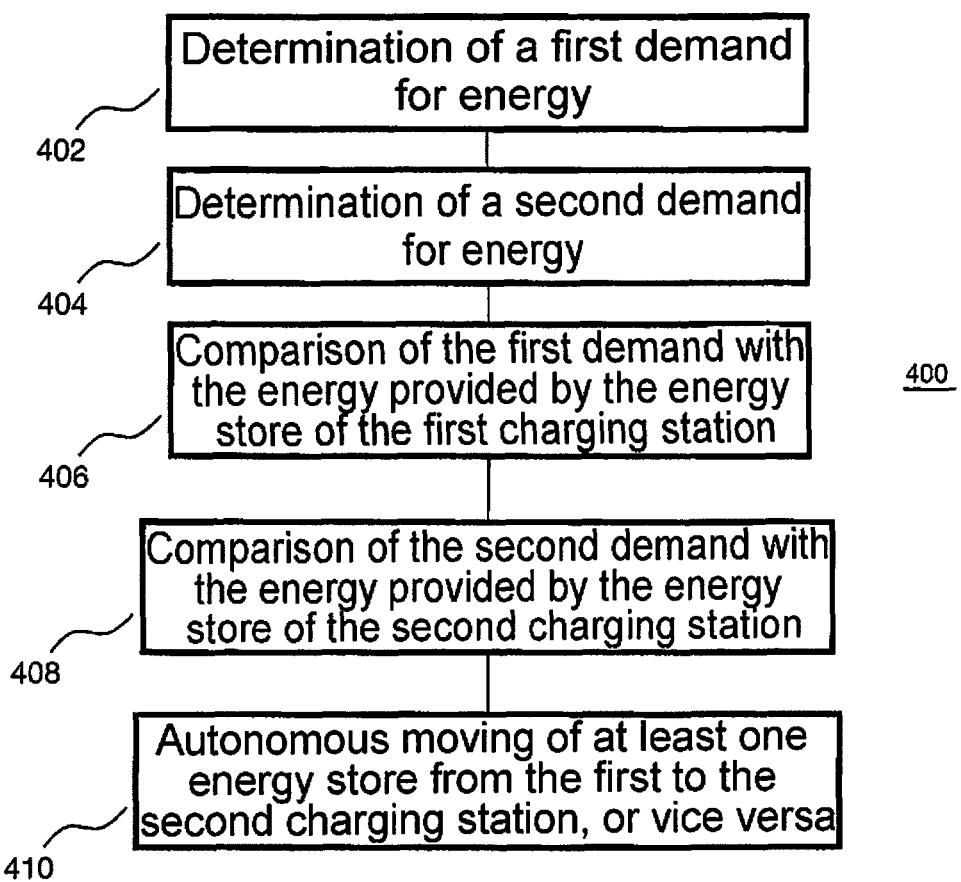
FIG. 4 shows a flow diagram of an exemplary embodiment of a method for apportioning a plurality of mobile energy stores to a first charging station and a second charging station.

FIG. 4 shows a flow diagram of a method 400 for apportioning a plurality of disclosed mobile energy stores to a first charging station and a second charging station. The method 400 in this case comprises determination 402 of a first demand for energy in a first region that is assigned to the first charging station, and determination 404 of a second demand for energy in a second region that is assigned to the second charging station. The first demand for energy and/or the second demand for energy may be determined, for example, on the basis of usage data of a plurality of monitored electrically driven vehicles that can be coupled to the mobile energy stores. It is assumed in this case that there is a fundamental demand (e.g., by structures located in the respective region) for energy to be transported in the first region or in the second region, and the energy demand by vehicles travelling in the respective region represents the predominant fluctuation of the energy demand.

The method 400 additionally comprises comparison 406 of the first demand with the energy that is provided by the proportion of the plurality of mobile energy stores that is assigned to the first charging station, and comparison 408 of the second demand with the energy that is provided by the proportion of the plurality of mobile energy stores that is assigned to the second charging station. In other words: the energy demand in the respective region is compared with the energy, at the respective charging station, that is available for transport (by the mobile energy stores).

On the basis of the comparisons, there is then effected autonomous moving 410, of at least one mobile energy store, out of the proportion of the plurality of mobile energy stores that is assigned to the first charging station, to the second charging station, or autonomous moving of at least one mobile energy store, out of the proportion of the plurality of mobile energy stores that is assigned to the second charging station, to the first charging station. In other words: the energy available for transport (by the mobile energy stores) at the respective charging station is adapted to the predicted demand. The method 400 shown in FIG. 4 therefore allows a demand-driven provision of the plurality of mobile energy stores, at both charging stations. A lack of available mobile energy store at one of the charging stations can thus be avoided.

LIST OF REFERENCES 100 mobile energy store
101 storage battery of the mobile energy store
102 receiving device
103 communication device
104 sensor element
105 control device
106 second sensor element
107 coupling device of the mobile energy store
108 wheel of the mobile energy store
109 navigation device
110 charging station
120 energy supply of the charging station
130 coupling device of the charging station
140 electrically driven vehicle
141 energy store of the electrically driven vehicle
142 coupling device of the electrically driven vehicle
150 coupling mobile energy store—vehicle
160 communication channel charging station—mobile energy store
170 communication channel mobile energy store—vehicle
180 communication channel vehicle—charging station
190 route of the mobile energy store
200 structure
201 energy store of the structure
202 coupling device of the structure
210 coupling mobile energy store—structure
220 communication channel mobile energy store—structure
230 communication channel structure—charging station

The invention claimed is:

1. A mobile energy store located on a transportation vehicle, the mobile energy store comprising:
   a storage battery configured to store energy and be charged at a first charging station;
   a receiving device configured to receive a request signal transmitted from a requesting load, the request signal including at least information about a location of the requesting load that is distant from the first charging station;
   a coupler configured to be connected to the requesting load for transferring energy from the storage battery to the requesting load; and
   a drive device configured to (i) move the mobile energy store autonomously in the public road traffic from the first charging station to the requesting load based on the request signal and (ii) move the mobile energy store autonomously in the public road traffic from the first charging station to a second charging station in response to determination that a second demand for energy at the second charging station is greater than a first demand for energy at the first charging station, wherein the first demand indicates energy demanded in a first region that is assigned to the first charging station, and the second demand indicates energy demanded in a second region that is assigned to the second charging station.

2. The mobile energy store of claim 1, wherein the receiving device is configured to receive the request signal of the requesting load from the first charging station.

3. The mobile energy store of claim 1, wherein the location of the requesting load is an instantaneous position of the requesting load or a predicted future position of the requesting load.

4. The mobile energy store of claim 1, wherein the drive device comprises at least the following:
   a navigation device which determines an instantaneous position of the mobile energy store;
   a sensor element which senses other road users; and
   a control device which controls wheels of the mobile energy store based on information of the sensor element about other road users, the instantaneous position of the mobile energy store, and the request signal of the requesting load.

5. The mobile energy store of claim 1, further comprising a communication device which sends identification information of the mobile energy store to the requesting load, receives identification information of the requesting load from the requesting load, and exchanges information with the requesting load relating to the coupling of the mobile energy store to the requesting load.

6. The mobile energy store of claim 1, further comprising a second sensor element which determines a first relative position of a coupling device of the mobile energy store in relation to a coupling device of the requesting load, the drive device additionally moves the mobile energy store, based on the first relative position, into a second relative position with respect to the requesting load that allows the coupling device of the energy store to be coupled to the coupling device of the requesting load, and the mobile energy store couples autonomously to the coupling device of the requesting load when the mobile energy store is in the second relative position with respect to the requesting load.

7. The mobile energy store of claim 6, wherein the coupling device of the mobile energy store additionally uncouples autonomously from the coupling device of the requesting load in response to the charge state of the storage device of the mobile energy store being below a first threshold value, or the charge state of an energy store of the load exceeding a second threshold value.

8. The mobile energy store of claim 7, wherein the drive device, after the uncoupling of the mobile energy store from the requesting load, autonomously moves the mobile energy store, based on a current position of the mobile energy store, either to the first charging station, from which the mobile energy store has moved autonomously, to the location distant from the first charging station or to a different charging station that is located closer to the current position of the mobile energy store.

9. The mobile energy store of claim 1, wherein the requesting load is an electrically-driven vehicle.

10. The mobile energy store of claim 9, wherein the request signal is based on an input of a user of the vehicle or on an energy demand calculated by the vehicle.

11. The mobile energy store of claim 1, wherein the storage battery stores the energy as electrical energy or as an energy-carrying medium.

12. A method for providing energy for a requesting load by a mobile energy store of an transportation vehicle, the method comprising:
   charging a storage battery of the mobile energy store at a first charging station;
   autonomously moving the mobile energy store in the public road traffic from the first charging station to the second charging station in response to determination that the second demand for energy at the second charging station is greater than the first demand for energy at the first charging station;

receiving a request signal of the requesting load by the mobile energy store, the request signal including at least information about a location of the requesting load that is distant from a corresponding charging station for the mobile energy store; and autonomously moving the mobile energy store in the public road traffic from the corresponding charging station to the location of the requesting load based on the request signal;

wherein the first demand indicates energy demanded in a first region that is assigned to the first charging station, and the second demand indicates energy demanded in a second region that is assigned to the second charging station.

13. The method of claim 12, further comprising:

autonomous coupling of the mobile energy store to the requesting load at the location distant from the corresponding charging station; and delivering energy to the requesting load by the mobile energy store.

14. The method of claim 13, further comprising:

autonomous uncoupling the mobile energy store from the requesting load in response to the charge state of the mobile energy store being below a first threshold value or the charge state of an energy store of the load exceeding a second threshold value; and autonomous moving the mobile energy store, based on a current position of the mobile energy store, either to the corresponding charging station from which the mobile energy store has moved autonomously to the location distant from the corresponding charging station or to a different charging station that is located closer to the current position of the mobile energy store.

15. The method of claim 12, wherein the requesting load is an electrically-driven vehicle.

* * * * *